United States Patent

Nogami et al.

[11] 4,157,205
[45] Jun. 5, 1979

[54] INERTIA-CONTROLLED VALVE UNIT FOR VEHICLE BRAKING SYSTEMS

[75] Inventors: Tomoyuki Nogami, Toyota; Takaaki Ohta, Okazaki, both of Japan

[73] Assignee: Toyota Jidosha Kogyo Kabushiki Kaisha, Toyota, Japan

[21] Appl. No.: 865,259

[22] Filed: Dec. 28, 1977

[30] Foreign Application Priority Data

Jan. 12, 1977 [JP] Japan .................................. 52-2697

[51] Int. Cl.[2] .............................................. B60T 8/14
[52] U.S. Cl. ................................. 303/24 A; 303/24 C
[58] Field of Search ................. 303/24 C, 24 A, 24 F, 303/6 C

[56] References Cited

FOREIGN PATENT DOCUMENTS 1079507 8/1967 United Kingdom ................. 303/24 C Primary Examiner—Trygve M. Blix
Assistant Examiner—Reinhard J. Eisenzopf
Attorney, Agent, or Firm—Kenyon & Kenyon

[57] ABSTRACT

In an inertia-controlled valve unit, a tubular stepped spool is assembled within a stepped bore of a differential piston through a coil spring. The piston is inserted together with the spool into a stepped bore of a housing in such a manner that the spool is fixed at one end thereof to an inner wall of the housing and that the piston is slidable in relation to the spool within a small diameter portion of the housing bore. The valve unit includes a ball valve housed within a large diameter portion of the housing bore and co-operating with a valve seat provided on the other end of the spool to interrupt the flow of fluid from an inlet chamber to an outlet chamber through the spool when the ball valve is subjected to a deceleration in excess of a predetermined value.

5 Claims, 2 Drawing Figures

INERTIA-CONTROLLED VALVE UNIT FOR VEHICLE BRAKING SYSTEMS

BACKGROUND OF THE INVENTION

The present invention relates to a fluid pressure control device for a vehicle braking system, and more particularly to an inertia-controlled valve unit for incorporation between a master cylinder and wheel brake cylinders in a vehicle braking system to control the braking pressure in accordance with the rate of deceleration of the vehicle.

SUMMARY OF THE INVENTION

The primary object of the present invention is to provide an inertia-controlled valve unit of which the component parts are precisely assembled in a stepped bore of a housing to enhance the efficiency of assembling works in a mass production process.

According to the present invention, there is provided an inertia-controlled valve unit for incorporation between a master cylinder and wheel brake cylinders in a vehicle braking system, comprising:

a housing provided at opposite ends thereof with an inlet port for connection to the master cylinder and an outlet port for connection to the wheel brake cylinders and provided therein with a stepped bore in open communication with the inlet and outlet ports respectively at the large and small diameter portions thereof;

a differential piston slidably disposed within the small diameter portion of the housing bore to provide first and second fluid chambers respectively in open communication with the inlet and outlet ports, the piston being provided therein with an axial stepped bore in open communication with the first and second chambers respectively at the large and small diameter portions thereof and having piston surfaces providing first and second effective piston areas whereby opposing displacement forces may be provided on the piston respectively in the directions toward and away from the inlet port;

a tubular stepped spool slidably disposed within the axial stepped bore of the piston to permit the flow of fluid between the first and second fluid chambers therethrough, the spool having one end fixedly connected to the inner wall of the housing in the second chamber and the other end exposed in the first chamber;

a coil spring disposed within an annular space between the piston and the spool and being engaged at one end thereof with a stepped portion of the spool and at the other end thereof with an inner shoulder of the piston to bias the piston toward the second chamber; and a cut-off valve including a valve seat provided on the other end of the spool and an inertia-controlled ball housed within the large diameter portion of the housing bore to co-operate with the valve seat, the ball rolling into engagement with the valve seat to interrupt the flow of fluid from the first chamber to the second chamber when the ball is subjected to a deceleration in excess of a predetermined value.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
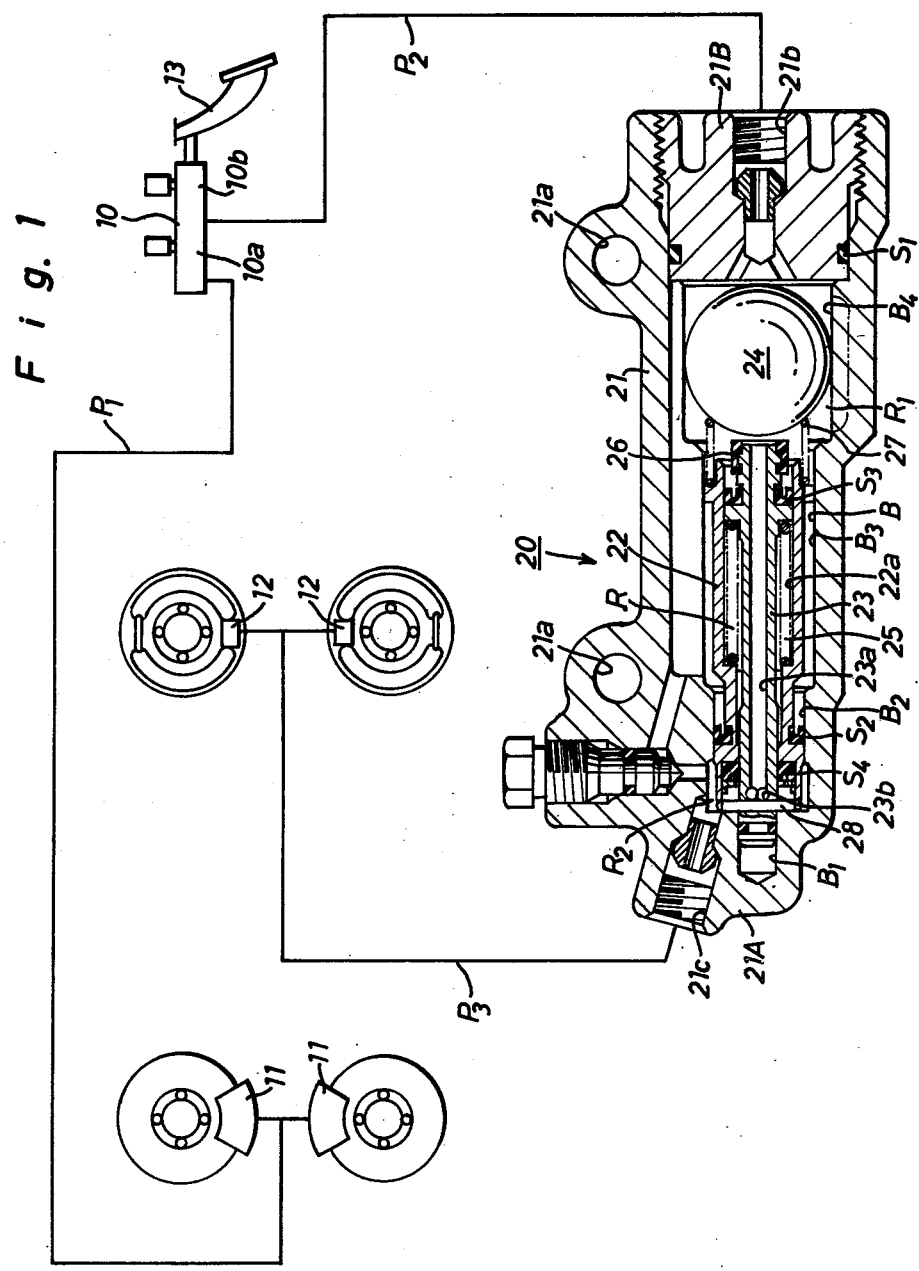
FIG. 1 is a schematic illustration of a vehicle braking system having an inertia-controlled valve unit in accordance with the present invention.

Referring now to the drawings, in particular to FIG. 1, a tandem master cylinder 10 is connected at its front pressure chamber 10a to front wheel brake cylinders 11 by way of a conduit $P_1$. An inertia-controlled valve unit 20 of the present invention is incorporated between conduits $P_2$ and $P_3$ connecting a rear pressure chamber 10b of the master cylinder 10 to rear wheel brake cylinders 12. The inertia-controlled valve unit 20 has a housing 21 in which a hollowed differential piston 22 and a tubular stepped spool 23 are concentrically assembled. The housing 21 includes a main body 21A and a plug 21B threaded into the main body 21A through an annular seal member $S_1$, the former being provided thereon with an outlet port 21c for connection to the wheel brake cylinders 12 and the latter being provided thereon with an inlet port 21b for connection to the master cylinder 10. A stepped cylindrical bore B in the housing 21 is communicated at its large diameter portion with the inlet port 21b and at its small diameter portion with the outlet port 21c. The housing 21 is further provided with a pair of mounting holes 21a which is adapted to mount the housing 21 on a vehicle body frame (not shown) at an inclined angle in relation to the horizontal.

The differential piston 22 is slidably disposed within second and third stepped portions $B_2$ and $B_3$ of the bore B through an annular seal member $S_2$ to form a first fluid chamber $R_1$ in open communication with the inlet port 21b and second fluid chamber $R_2$ in open communication with the outlet port 21c. The differential piston 22 is provided with an axial stepped bore 22a which is communicated at its large diameter portion with the first fluid chamber $R_1$ and at its small diameter portion with the second fluid chamber $R_2$.

The tubular stepped spool 23 is slidably disposed within the stepped bore 22a of the piston 22 through annular seal members $S_3$ and $S_4$ and is fixedly engaged with a first stepped portion $B_1$ of the bore B. The stepped spool 23 is provided at its right end with an annular valve seat 26 and has an axial passage 23a and radial holes 23b through which the first fluid chamber $R_1$ is communicated with the second fluid chamber $R_2$. Thus, the differential piston 22 is biased leftward or forward by a first compressed coil spring 25, one end of which is engaged with a stepped portion of the spool 23 and the other end with an inner shoulder of the piston 22.

An inertia-controlled ball 24 is housed in the first fluid chamber $R_1$ to be permitted to roll in the leftward or forward direction. The ball 24 co-operates with the valve seat 26 of the spool 23 to provide a cut-off valve which functions to interrupt the flow of fluid from the first chamber $R_1$ to the second chamber $R_2$. The ball 24 is biased in the rightward or rearward direction and resiliently supported in the assembled position by means of a second coil spring 27, one end of which is engaged with the differential piston 22.

In assembling process of the valve unit 20, the coil spring 25 is firstly inserted into the stepped bore 22a of the piston 22 and then the stepped spool 23 is assembled within the piston 22 through the spring 25. Thus, the stepped spool 23 is previously engaged at its left end with the piston 22 by means of a stopper pin 28 to compress the coil spring 25 with a predetermined load. Thereafter, the piston 22 is inserted together with the spool 23 into the cylindrical stepped bore B of the housing 21 in such a manner that the stepped spool 23 is fixedly engaged at its left end with the first stepped portion $B_1$ of the bore B and that the piston 22 is slidable in relation to the fixed spool 23 within the second and third stepped portions $B_2$ and $B_3$ of the bore B. Secondly, the coil spring 27 is engaged with the piston 22 in the housing 21 and the ball 24 is housed within a fourth stepped portion $B_4$ of the bore B. Finally, the plug 21B is threaded into the housing 21 to resiliently support the ball 24 by means of the second spring 27. In such assembled construction, it will be noted that the respective stepped portions $B_1$ to $B_4$ of the bore B serve to precisely assemble the piston 22, the spool 23 and the ball 24 on a common axis to thereby realize precise mass production of the valve unit 20.

In operation of the inertia-controlled valve unit 20, when the brake pedal 13 is depressed under an unloaded condition of the vehicle, master cylinder pressure Pm is produced in the front and rear pressure chambers 10a and 10b of the master cylinder 10. The pressure in the front pressure chamber 10a is directly applied to the front wheel brake cylinders 11 via the conduit $P_1$. Meanwhile, the pressure in the rear pressure chamber 10b is applied to the first fluid chamber $R_1$ of the valve unit 20 via the conduit $P_2$ and subsequently applied to the second fluid chamber $R_2$ through the passage 23a and holes 23b of the spool 23, and then finally applied to the rear wheel brake cylinders 12 via the conduit $P_3$. Thus, the front and rear wheel cylinders 11 and 12 are actuated to operate the brakes in response to the value of the master cylinder pressure Pm. In this instance, the differential piston 22 is moved in the rightward or rearward direction against the first and second springs 25 and 27 by pressure acting on the effective differential surfaces thereof to increase the resilient force of the spring 27.

When the master cylinder pressure Pm increases to a value $Pm_1$ where the ball 24 is subjected to a deceleration in excess of a predetermined value (for instance, 0.3 G), the ball 24 starts to roll forwardly against the resilient force of the second spring 27 and moves into engagement with the valve seat 26 to cut-off the fluid communication between the first and second fluid chambers $R_1$ and $R_2$. This operation stage is indicated by a point a in FIG. 2. If the master cylinder pressure Pm further increases by continued application of the brake pedal 13, the differential piston 22 is moved in the leftward or forward direction in accordance with the increase of the pressure in the first fluid chamber $R_1$ so that the wheel cylinder pressure Pw trapped in the second chamber $R_2$ is increased as indicated by a line segment a–b in FIG. 2.

When the master cylinder pressure Pm increases up to a high value $Pm_2$, the differential piston 22 is engaged with the stopper pin 28 to restrict the forward movement of the piston 22. Thereafter, the wheel cylinder pressure Pw in the second chamber $R_2$ will no longer increase despite of further increase of the master cylinder pressure Pm. Thus, the wheel cylinder pressure Pw is maintained in a predetermined high value as indicated by a line segment b–c in FIG. 2.

In the case that the brake pedal 13 is depressed under a loaded condition of the vehicle, the rate of deceleration does not reach the predetermined value (0.3 G) even if the master cylinder pressure Pm increases to the value $Pm_1$. As a result, the ball 24 does not roll forwardly and permits the flow of fluid from the first chamber $R_1$ to the second chamber $R_2$. Thus, the wheel cylinder pressure Pw is continuously increased in accordance with the master cylinder pressure Pm and simultaneously the differential piston 22 is further moved against the first and second springs 25 and 27 in the rightward direction by pressure acting on the effective differential piston surfaces to increase the resilient force of the second spring 27.

When the master cylinder pressure Pm increases up to a value $Pm_3$ where the ball 24 is subjected to a deceleration in excess of a predetermined high value (for instance, 0.6 G), the ball 24 starts to roll forwardly by the inertia moment against the resilient force of the second spring 27 and moves into engagement with the valve seat 26 to cut-off the flow of fluid from the first chamber $R_1$ to the second chamber $R_2$. This operation stage is indicated by a point a' in FIG. 2. Furthermore, the remaining function of the valve unit 20 is substantially the same as in the case when the vehicle is under the unloaded condition and will apparently be recognized when referred to a line segment a'–b'–c' in FIG. 2.

Figure 2:
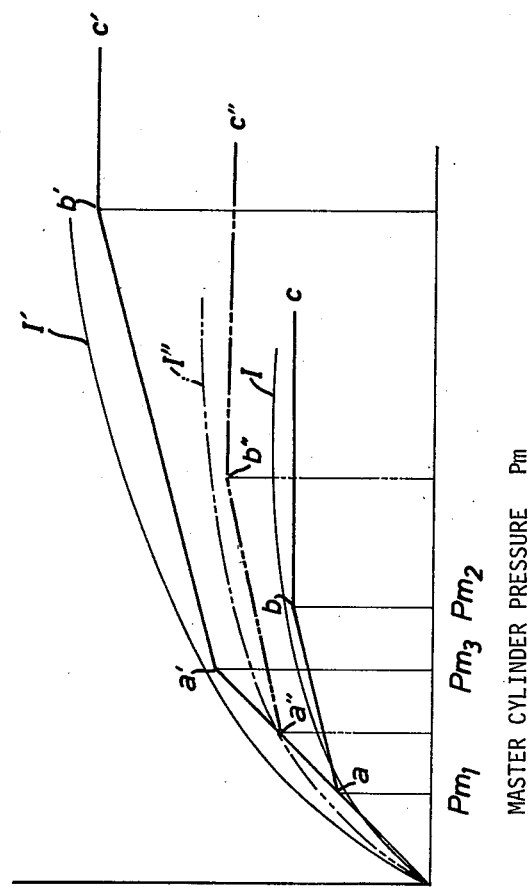
FIG. 2 is a graph showing the pressure controlling characteristics of the valve unit.

From the above description, it will be understood that the second spring 27 is adapted to realize the control of the wheel cylinder pressure under the heavy loaded condition of the vehicle as illustrated by an ideal characteristic line I' in FIG. 2. If the changes of vehicle load is rather small in such a passenger car, it is not necessary to assemble the second spring 27 within the valve unit 20. In this instance, the wheel cylinder pressure under a loaded condition of the passenger car will be controlled as illustrated by an ideal characteristic line I" in FIG. 2.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specificically set forth herein.

What is claimed is:

1. An inertia-controlled valve unit for incorporation between a master cylinder and wheel brake cylinders in a vehicle braking system, comprising:

a housing provided at opposite ends thereof with an inlet port for connection to said master cylinder and an outlet port for connection to said wheel brake cylinders and provided therein with a stepped bore in open communication with said inlet and outlet ports respectively at the large and small diameter portions thereof;

a differential piston slidably disposed within the small diameter portion of said housing bore to provide first and second fluid chambers respectively in open communication with said inlet and outlet ports, said piston being provided therein with an axial stepped bore in open communication with said first and second chambers respectively at the large and small diameter portions thereof and having piston surfaces providing first and second effective piston areas whereby opposing displacement forces may be provided on said piston respectively in the directions toward and away from said inlet port;

a tubular stepped spool slidably disposed within the axial stepped bore of said piston to permit the flow of fluid between said first and second fluid chambers therethrough, said spool having one end fixedly connected to the inner wall of said housing in said second chamber and the other end exposed in said first chamber;

a coil spring disposed within an annular space between said piston and said spool and being engaged at one end thereof with a stepped portion of said spool and at the other end thereof with an inner shoulder of said piston to bias said piston toward said second chamber; and a cut-off valve including a valve seat provided on the other end to said spool and an inertia-controlled ball housed within the large diameter portion of said housing bore to co-operate with said valve seat, said ball rolling into engagement with said valve seat to interrupt the flow of fluid from said first chamber to said second chamber when said ball is subjected to a deceleration in excess of a predetermined value.

2. An inertia-controlled valve unit as claimed in claim 1, wherein said housing bore includes a medium diameter portion between said large and small diameter portions and said differential piston is slidably guided at a portion thereof within the medium diameter portion of said housing.

3. An inertia-controlled valve unit as claimed in claim 1, wherein said stepped spool is provided thereon with a stopper pin engageable with one end of said differential piston to compress said coil spring with a predetermined load in assembling process of said valve unit.

4. An inertia-controlled valve unit as claimed in claim 1, further comprising a second coil spring engaged at one end thereof with said ball and at the other end thereof with said piston to resiliently support said ball in the assembled position, the resilient force of said second spring being increased in accordance with the movement of said piston toward said inlet port.

5. An inertia-controlled valve unit as claimed in claim 1, wherein said inlet port is provided on a plug threaded into said housing coaxially with said housing bore.

* * * * *